United States Patent
Braxton

(10) Patent No.: US 6,317,900 B1
(45) Date of Patent: Nov. 20, 2001

(54) METHOD AND DEVICE FOR THE DISPOSAL, RECOVERY AND RECYCLING OF PHARMACEUTICALS FROM HUMAN WASTES

(76) Inventor: Earl J. Braxton, 3487 Eastpointe, Shelby Township, MI (US) 48316

( * ) Notice: Subject to any disclaimer, the term of this patent is extended or adjusted under 35 U.S.C. 154(b) by 97 days.

(21) Appl. No.: 09/040,245

(22) Filed: Feb. 23, 1998

Related U.S. Application Data

(63) Continuation-in-part of application No. 08/504,132, filed on Jul. 19, 1995, now abandoned.

(51) Int. Cl.⁷ .................................................. A47K 11/04
(52) U.S. Cl. ...................................................... 4/483
(58) Field of Search ...................................... 4/483

(56) References Cited

U.S. PATENT DOCUMENTS

| | | | |
|---|---|---|---|
| 4,479,937 | 10/1984 | Sato et al. | 424/99 |
| 4,783,263 | 11/1988 | Trost et al. | 210/638 |
| 4,818,535 | 4/1989 | Baines et al. | 424/407 |
| 4,944,884 | 7/1990 | Naoi | 210/692 |
| 5,045,207 | 9/1991 | Fecondini et al. | 210/645 |
| 5,256,300 | 10/1993 | Cockett et al. | 210/691 |
| 5,485,637 * | 1/1996 | Green | 4/483 |
| 5,508,004 * | 4/1996 | Held et al. | 422/22 |

* cited by examiner

*Primary Examiner*—Robert M. Fetsuga
(74) *Attorney, Agent, or Firm*—Vanophem & Vanophem, P.C.

(57) ABSTRACT

A method for removing pharmaceutical agents from human wastes. Such pharmaceuticals may include their metabolized byproducts, either or both of which may be harmful as a toxin or a carcinogen. The method generally includes the use of a portable human waste containment unit which is configured to serve as a toilet for an individual who has been treated with a pharmaceutical agent. The waste containment unit is preferably configured as a self-contained unit with a separate removable reservoir or plastic reservoir liner, such that it is capable of being sealed for transporting to a facility where human wastes contained within the waste containment unit or its separate reservoir or liner can be appropriately processed. An outer, upper surface of the waste containment unit forms a seat equipped with a cover for sealing the waste containment unit. The waste containment unit includes a reservoir whose capacity is preferably sufficient to hold human waste produced over approximately a period in which pharmaceuticals and their metabolized byproducts are typically eliminated from the body of an individual. The waste containment unit will be of different configurations to fit the patients' needs in the hospital, in the home, and for use while the patient is mobile and being treated as an outpatient. The purpose of the different types of waste containment units is to interdict the pharmaceuticals before they enter the eco-system through a municipal sewage system or a septic tank system.

18 Claims, 2 Drawing Sheets

METHOD AND DEVICE FOR THE DISPOSAL, RECOVERY AND RECYCLING OF PHARMACEUTICALS FROM HUMAN WASTES

CROSS REFERENCE TO RELATED APPLICATION

The present application is a continuation-in-part application of U.S. Ser. No. 08/504,132, filed Jul. 19, 1995, abandoned.

BACKGROUND OF THE INVENTION

1. Field of the Invention

The present invention generally relates to methods for the removal of pharmaceutical agents from human waste that is completely segregated from all other types of waste matter. More specifically, this invention relates to a method in which a permanent or portable device is provided to be used by individuals who have been treated with pharmaceutical agents, which if released into the environment could pose an environmental hazard. The portable device is configured for two types of toilet facilities. One type can be transported and used daily by outpatients and patients recovering at home. Another type of unit is removably installed semi-portably in a hospital facility to allow isolation of a patient's waste from the sewage system and, thus, from the ecosystem. Thereafter the waste as an isolated unit is transported to a facility where the pharmaceuticals can be harvested, isolated and then either disposed of or recycled.

2. Description of the Prior Art

In response to ecological considerations, the proper treatment and disposal of waste materials have become increasingly of concern. Much interest has been directed toward solid waste management, with recent emphasis on the exclusion of toxic materials from landfills. A counterpart to solid waste management is the treatment of human wastes. Sewage treatment plants have long been used to purify sewage through the activity of aerobic or anaerobic bacteria which digest sewage. The bacteria convert the sewage into a sludge which, when filtered and dried, can be used as a fertilizer base.

While such techniques serve their purpose well, the processes involved generally do not have any effect on pharmaceutical wastes expelled into the ecosystem from the patient and those pharmaceuticals are toxic to all when present in the sewage system. No regard has been given to pharmaceutical wastes present in homes which rely on septic tank systems. Generally, and as used herein, pharmaceutical wastes are pharmaceutical agents and their metabolized byproducts which are excreted by individuals being treated with such agents. An example of the toxic oncology drugs secreted in human waste and the length of time for their excretion is illustrated in the following chart.

A Partial List of the Toxic Oncology Drugs Secreted In Human Waste And the Length of Time for Their Excretion

| | |
|---|---|
| Bleomycin | excreted in urine 72 hrs. 50% in $1^{st}$ day |
| Busulfan | excreted in urine 12–24 hrs. |
| Carboplatin | excreted in urine 24 to 48 hrs. |
| Carmustine | excreted in the urine over 96 hrs. |
| Chlorambucil | excreted in urine in 48 hrs. |

-continued

| | |
|---|---|
| Cistplatin | excreted in urine in 7 days |
| Citrate | excreted in feces and urine |
| Chlorambucil | excreted mostly in urine 60% in 24 hrs. |
| Cyclophosphamide | excreted in urine 72 hours (i.v.) |
| Cytarabine hydrochloride | excreted in the urine within $1^{st}$ day |
| Dacarbazine | excreted in the urine 30–46% within 6 hrs. |
| Dactinomycin | excreted in urine in 5 days 20% in first 24 hrs. |
| Daunorubicin | excreted in feces 7 days 48 hrs. in urine |
| Doxorubicin | excreted in feces 7 days urine 6 days |
| Epirubicin Hydo | excreted in urine 7 days and feces 5 days |
| Etoposide | excreted in urine in 4 days feces in 7 days |
| Fluorouracil | excreted in urine in 48 hrs. |
| Floxuridine | excreted in the urine |
| Hydrochloride | 60% excreted in urine 40% in feces |
| Hydroxyurea | excreted in urine |
| Ifosfamide | excreted in urine 48 hrs. |
| Limustine | excreted principally in the urine |
| Mechlorethamine hydrochloride | excreted in urine in 48 hrs. |
| Megestrol Acetate | excreted in urine 57–78% |
| Melphalan | excreted in urine 48 hrs. |
| Mercaptopurine | excreted in urine in 72 hrs. |
| Methotrexate | excreted in the urine 72 hrs. |
| Mitomycin | excreted in urine first day |
| Mitoxantrone Hydrochloride | excreted in urine |
| Plicamycin | excreted in urine 40% in 15 hrs. |
| Streptozocin | excreted principally in urine |
| Tamoxifen | research not completed |
| Thiotepa | excreted in urine in 72 hrs. |
| Thioguanine | excreted in urine in 72 hrs. |
| Vincristine sulfate | excreted in urine 4 days |
| Vinblastine Sulfate | excreted in urine 4 days |

Often, the agents and/or their metabolized byproducts are carcinogenic, particularly those pharmaceuticals used in oncological treatments and chemotherapy, and therefore pose a toxic hazard risk. Consequently, sewage treatment plants and septic systems typically generate some level of carcinogens, which are released into the environment as a byproduct of sewage treatment plants and septic systems.

The hazards of such carcinogenic wastes have been recognized, and in response hospitals employ appropriate waste disposal techniques for medical devices such as syringes, clothing, pharmaceutical containers and mixing equipment, and for unused medicinal portions, but no thought has been given to their patients who have been treated with pharmaceuticals whose human metabolic waste could pose a hazard to the environment. Moreover, patients are often released from the hospital while therapeutic drug levels are still in their bodies, or are treated on an outpatient basis. As such, any harmful pharmaceuticals within their systems may or may not be eliminated within the controlled environment of the hospital, but will generally be eliminated elsewhere for up to about three days, such that the pharmaceuticals are again released directly into a municipal sewage system or septic system.

Various approaches to isolating constituents of human waste have been proposed in the past, though none have been addressed to solving the problem outlined above. Moreover, the devices taught for isolating human waste constituents have not been adapted or suitable for use by patients on an individual basis. As an example, U.S. Pat. No. 4,285,077 to Braxton teaches a portable public toilet which is equipped with a filtering device disposed in the drain conduit of a urinal bowl. The filtering device serves to collect pharmaceutically useful trace elements within urine which passes through the filtering device. While well conceived for its purpose, the large portable toilet taught by Braxton is impractical for use by individual patients over a brief period after treatment and after release from the hospital. Furthermore, the portable toilet is only directed to isolating certain trace elements from urine.

Current disposal and contamination prevention procedures do not take into account the hazards of burning toxic medical wastes that contain remnants of toxic pharmaceuticals. The burning procedure simply changes the pollution from a water borne pollutant via the sewage treatment system to an airborne pollutant via current incineration procedures. Most approved incinerators today cannot effectively or safely destroy the toxic drugs by burning.

From the above, it can be appreciated that the prior art is lacking a method for preventing the release of potentially hazardous pharmaceuticals into municipal sewage systems by patients who have undergone treatment with such pharmaceuticals. Accordingly, what is needed is a reliable and sanitary method by which human wastes can be collected, to isolate, remove and treat toxic components in a cost efficient manner, such that the pharmaceuticals can be properly disposed, recovered or recycled. Ideally, such a method would enable such pharmaceuticals to be reclaimed and recycled when possible.

SUMMARY OF THE INVENTION

According to the present invention there is provided a method for collecting, segregating by type, and removing pharmaceutical agents introduced into the human body for medical treatment of patients from human wastes. Such pharmaceuticals may include their metabolized byproducts, either or both of which may be harmful as a toxin or a carcinogen. The method generally includes the use of a portable human waste containment unit (WCU) or permanent unit configured to adapt to a standard toilet and removably attached thereto which serves as a toilet for an individual who has been treated with a pharmaceutical agent. The permanent unit is identical to the portable unit but designed to custom fit existing toilet facilities and be equipped with a removable waste containment suction that is removed on a regular basis. The removable portion would include any part of the unit that comes into contact with the patient's body or waste.

The unit can be removably fixed to a standard toilet or portable and has specialized components made from easily destroyed or replaceable materials that come into contact with the patient's body. This is to allow for the destruction or disinfecting of the toxic drugs that are eliminated by the patient through the normal process of perspiration.

The waste containment unit is preferably configured as a self-contained unit, such that it is capable of being sealed for transporting as a unit to a facility where human wastes accumulated within the waste containment unit can be appropriately processed. An outer, upper surface of the waste containment unit forms a seat equipped with a cover for sealing the waste containment unit. The waste containment unit includes a reservoir whose capacity is preferably sufficient to hold human waste produced over approximately a seven day period, such that the reservoir has a capacity for use during a period in which pharmaceuticals and their metabolized byproducts are typically eliminated from the body of an individual.

This new technology requires the complete segregation of the patient's bodily wastes and is not limited to urine and feces as it must contain the specific provision that all parts of the sanitation unit that come in contact with the patient must be disinfected or replaced and destroyed in an approved manner. The patient can expel the toxic drugs through their normal function of perspiration.

This device is the only waste abatement process that is in place in the hospital and in the patient's home. This device is customized for each patient to be utilized in the hospital and home and is structured to prevent combining of different types of pharmaceuticals which may cause a greater pollution hazard.

As such, the waste containment unit of this invention enables a method by which human wastes containing pharmaceutical agents and their metabolized byproducts can be collected by a patient both while in the hospital and while away from the hospital. As noted above, both waste containment units are configured with a seat, allowing the patient to sit on the waste containment unit and void into the waste containment unit. Because the preferred waste containment unit of this invention is portable, the patient is capable of using it at home or any other location which is convenient for its use.

Thereafter, the waste reservoir compartment of the waste containment unit can be sealed and transported to a suitable facility, where the pharmaceutical agents can be removed from the human wastes. The wastes can then be processed with bacteria or incinerated in a conventional manner known in the art as discussed in U.S. Pat. No. 4,168,316 to Webster, Jr. et al.; U.S. Pat. No. 4,359,415 to Sloane; U.S. Pat. No. 4,452,987 to Bonifacio; U.S. Pat. No. 4,479,937 to Said et al; and U.S. Pat. No. 4,944,884 to Naoi; as well as other conventional processes well known in the art and incorporated herein by reference. In contrast, the pharmaceutical agent or agents can be recycled, if possible, or otherwise properly disposed of in an appropriate manner. Any metabolized byproducts of the pharmaceutical agent can also be removed and recycled or disposed of in a manner known in the art.

In view of the above, it can be seen that a significant advantage of the present invention is that a method is provided by which harmful pharmaceutical agents and their metabolized byproducts can be prevented from entering a municipal sewage treatment plant or septic system. The harmful pharmaceutical agents and their metabolized byproducts are now entering the environment as airborne or ground pollutants when the delivery instruments such as syringes are destroyed by burning or dumping in landfills. The invention will allow a safe place in which to clear out the syringes or IV instruments to further prevent the toxic drugs from entering the ecosystem. As such, a source of toxic and carcinogenic matter is prevented from being eventually released into the environment. The benefits of this invention are particularly significant for large urban areas where relatively high levels of pharmaceuticals may be present in the municipal sewage.

Another advantage of this invention is that some pharmaceuticals can be reclaimed, and thereafter returned to a pharmaceutical company for purification and reuse. As such, the method of this invention provides a potentially economical source for certain pharmaceuticals. A particularly useful scenario for the implementation of this invention is for patients undergoing chemotherapy or other medical therapy, in which patients are subjected to treatment with toxic pharmaceuticals.

Accordingly, it is an object of the present invention to provide a method by which pharmaceutical agents can be prevented from entering the environment by isolating and removing the agents from human wastes.

It is a further object of the invention that the method entail the use of a removably permanent or portable waste containment unit which is configured as a self-contained unit for use by an individual.

It is still a further object of the invention that the waste containment unit be provided with a seat formed on one surface thereof, so as to permit an individual to sit on the waste containment unit while voiding into the waste containment unit.

It is another object of the invention that the portable waste containment unit be constructed in a manner that allows the proper sterilization or disposal of all parts and materials touched by either the patient or the patient's wastes, such as the seat, lid and the waste receptacle.

It is yet another object of the invention that the waste containment unit be configured to accommodate human wastes produced over a period in which pharmaceuticals and their metabolized byproducts are eliminated from the body of the user (see chart hereinabove).

It is yet another object of the invention that the method enable pharmaceuticals to be reclaimed, and thereafter returned to a pharmaceutical company for purification and reuse.

Other objects and advantages of this invention will be more apparent after a reading of the following detailed description taken in conjunction with the drawings provided.

DETAILED DESCRIPTION OF THE PREFERRED EMBODIMENT

The present invention provides a method by which pharmaceutical agents and/or their metabolized byproducts can be isolated and removed from human wastes, so as to prevent such components from entering a sewage treatment plant where they would eventually be released into the environment. The invention also serves as a reservoir for the residue from the cleaning of the delivery instruments such as syringes or IV bags or tubes. The toxic drugs in such delivery instruments are now entering the environment as air or ground pollutants when these delivery devices are burned or buried. As such, pharmaceuticals and their metabolized byproducts that are harmful as toxins or carcinogens are prevented from being released into the environment, where they would pose an environmental and health hazard.

The total waste byproduct would be liquefied in a controlled closed environment and would be lyophilized into a dry powder and sorted by pharmaceutical brand or type. At all times no name identification record would exist. The lyophilized powder is reconstituted in a sterile solution. The toxic pharmaceutical is thereafter separated from the sterile slurry in the same manner that the original manufacturer purified the drug for the initial regulatory approval. The pharmaceutical disposal procedure and disposal of the clean up residue follows the same methodology as that of the original manufacturer.

Figure 1:
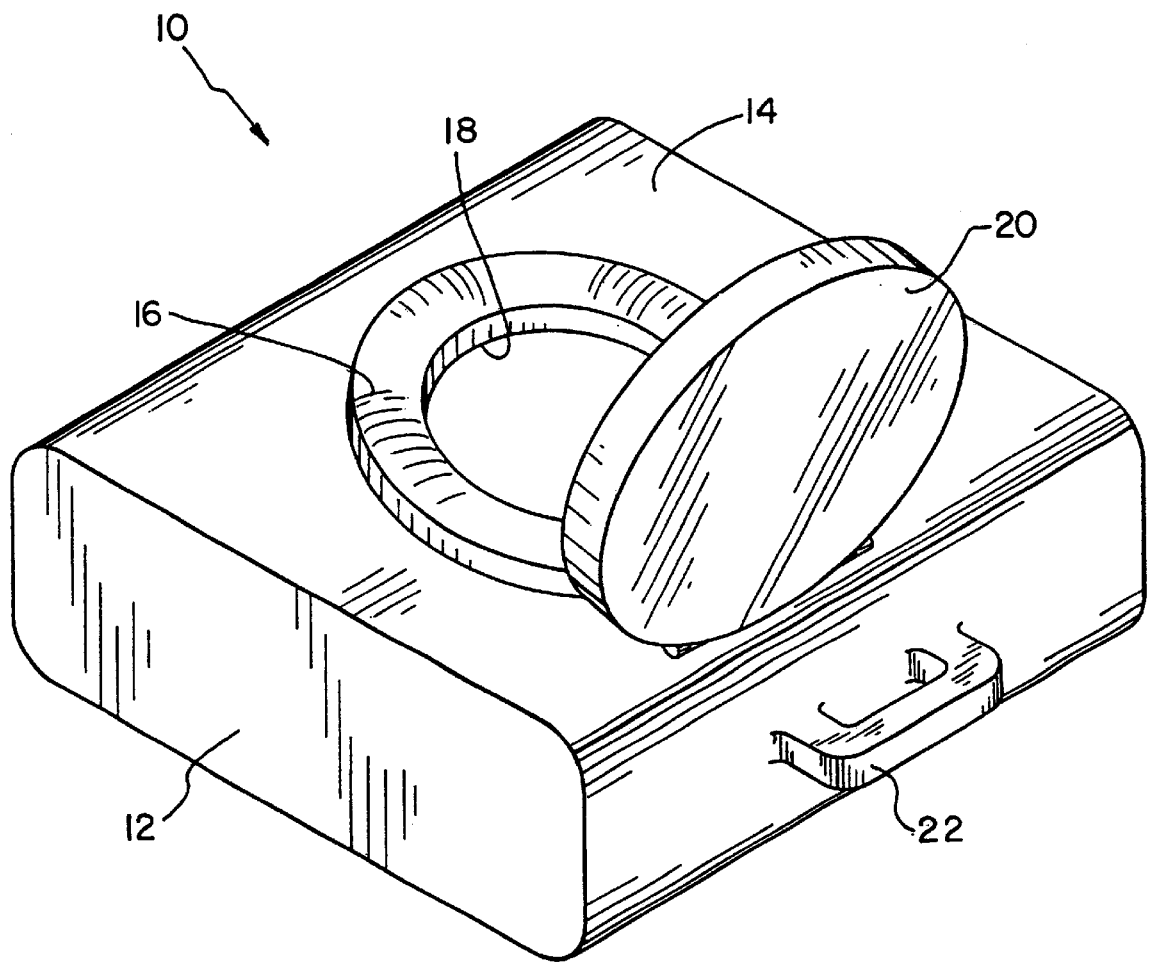
FIG. 1 view of a portable toilet for use in the method of this invention.

With reference to FIG. 1, there is shown a portable human waste receptacle 10 which constitutes a key feature of this invention. The receptacle 10 is configured to serve as a portable toilet for an individual who has been treated with a pharmaceutical that, due to its toxicity, would be hazardous if released into the environment. The following description will specifically refer to the receptacle 10 shown in FIG. 1, though it will be apparent that the receptacle 10 could be considerably altered in its appearance, and yet be configured to function in the manner intended by this invention.

As shown in FIG. 1, the receptacle 10 is configured as a self-contained unit, meaning that the receptacle 10 is capable of being sealed for transporting as a unit to a facility where human wastes within the receptacle 10 can be appropriately processed. The receptacle 10 is generally composed of a tank 12 having an upper surface 14 which is sufficiently large to enable its use as a seat. The tank 12 is preferably formed from a suitably strong plastic material which is stain resistant and can be readily cleaned for reuse. Ideally, the exterior of the receptacle 10 is manufactured to conceal its function.

Figure 2:
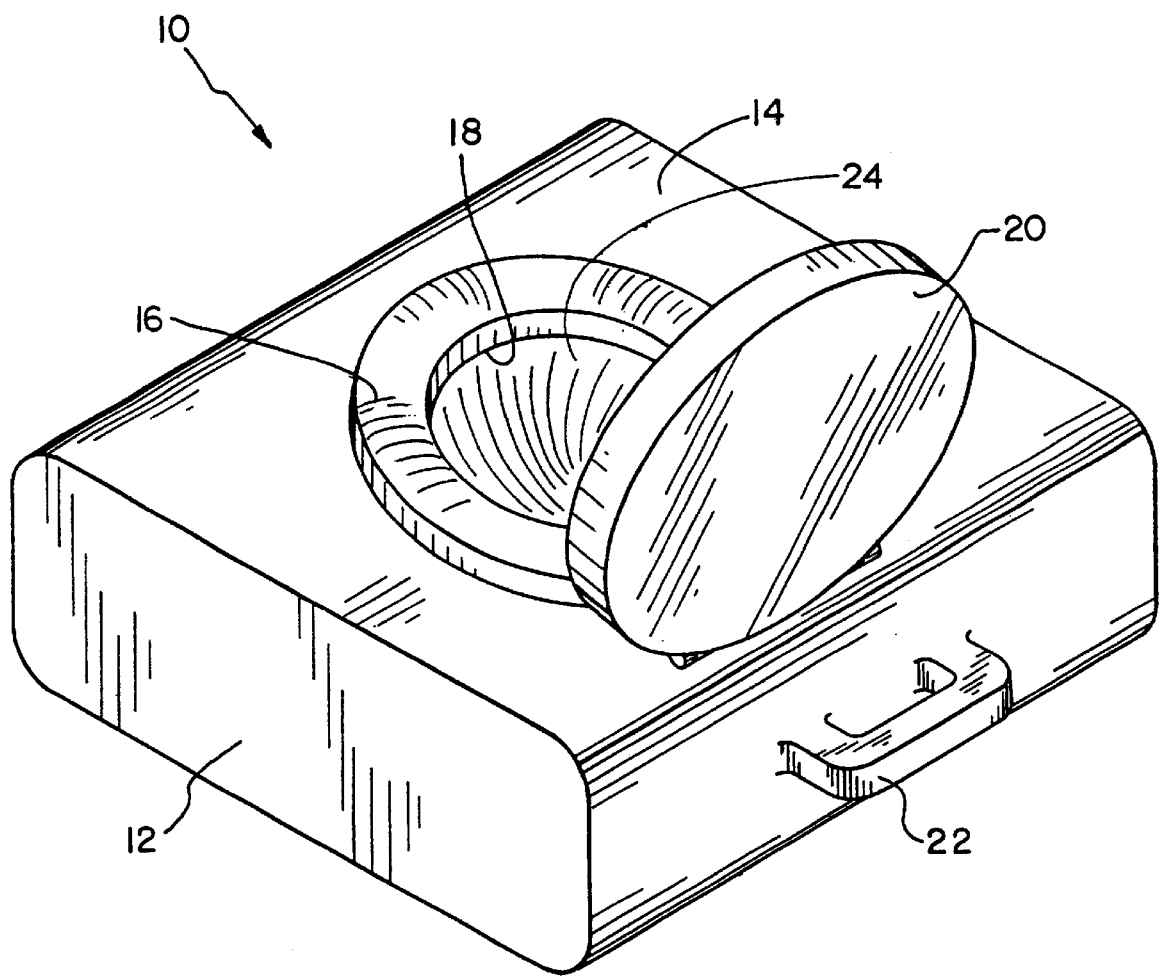
FIG. 2 is a perspective view of a portable toilet for use in the method of this invention using an optional plastic liner.

The tank 12 forms an internal reservoir whose capacity is preferably sufficient to hold human waste produced over approximately a three day period, which is generally the period over which pharmaceuticals and their metabolized byproducts are typically eliminated from the body of an individual. Optionally, as shown in FIG. 2, the portable unit may also contain a heavy, leak-proof plastic liner 24 that can be sealed and utilized to transport the waste material safely to a facility at which the contents can be removed and processed. Optionally, the reservoir or the liner may also contain a solution which neutralizes the odor of the waste material without affecting the ability to isolate pharmaceutical agents in the material.

A seat 16 is formed on the upper surface 14 of the tank 12 and surrounds an opening 18 into the reservoir. The seat 16 may be integrally formed with the tank 12, or formed as a separate component that is bonded or adhered to the tank 12. The seat 16 may be equipped with a hinged cover 20 that is configured to sealingly close the opening 18, such that the receptacle 10 can be sealed and transported safely to a facility at which the contents of the tank 12 can be removed and processed. The cover 20 may also be preferably equipped with a lock (not shown) so as to secure the cover 20 and to prevent accidental and intentional tampering with the human wastes contained within the tank 12. Furthermore as shown, the tank 12 preferably includes an integrally molded handle 22 to facilitate transport of the waste receptacle 10, however, any other suitable handle may be employed as will be apparent to those skilled in the art.

The above-described receptacle 10 enables the method of this invention, by which human wastes containing pharmaceutical agents and their metabolized byproducts can be collected by the patient. Because the receptacle 10 is equipped with a seat 16, the patient is able to sit directly on the upper surface 14 of the waste receptacle and void into the receptacle 10 through the opening 18. The portability of the receptacle 10 renders it highly suitable as a unit which can be provided to patients on a short term basis both during their treatment in the hospital and after their treatment and/or release from the hospital.

Therefore, in use the receptacle 10 is employed for several days, typically three days after the last treatment with a pharmaceutical of concern. Optionally, at the end of the required duration, the receptacle 10 is sealed by closing the cover 20. However, it is possible that at the end of the date or the specific duration, the plastic liner is removed and sealed to prevent contamination of and tampering with its contents. As noted previously, the cover 20 is preferably locked in place so as to prevent contamination of and tampering with the contents of the recetacle 10. The patient or a qualified courier then transports the receptacle 10 or the sealed liner to a suitable facility where the pharmaceutical agent and/or its metabolized byproducts are isolated and removed from the human wastes. It is anticipated that the sealed liner of the portable receptacle 10 would be provided with identification means so as to be capable of notifying the processing facility of the pharmaceuticals which are present in the waste material. Optionally, this information may be coded in a manner that protects the identity of the patient.

The appropriate processing technique required to isolate a given agent is dependent on the type of pharmaceutical in question. Suitable techniques for the isolation and removal of numerous pharmaceuticals are known to those skilled in the art. Such pharmaceutical agents may be capable of being reclaimed and recycled, in order to allow the agents to be reprocessed into a usable form. Harmful metabolized byproducts of pharmaceutical agents may also be removed and then recycled or disposed of in a manner known in the art. After removal of the agent and its byproducts, the remaining human waste can be processed with bacteria in a conventional manner known in the art.

Current disposal and contamination prevention procedures do not take into account the hazards of burning toxic medical wastes that contain remnants of toxic pharmaceuticals. The burning procedure simply changes the pollution from a water borne pollutant via the sewage treatment system to an airborne pollutant via current incineration procedures. Most approved incinerators today cannot effectively or safely destroy the toxic drugs by burning.

When adequate processing techniques are not available, the entire contents of the sealed liner or the receptacle 10 may be disposed of or destroyed in a manner permitted by applicable regulations which prevent the pharmaceuticals of concern from being released into the environment.

In view of the above, it can be seen that a significant advantage of the present invention is that a method is provided by which harmful pharmaceutical agents and their metabolized byproducts can be prevented from entering the environment. The current handling of those contaminants allows the contaminants to enter the environment as water, air and/or ground pollutants while the great bulk of the toxic pharmaceuticals expelled into the environment through patient waste elimination are ignored. Due to the prevalent occurrence of both in-hospital and outpatient treatment, it is believed that the method of this invention may prevent the bulk of toxic drugs used in the treatment of various human afflictions from entering the ecosystem through municipal sewage treatment plants. As a result, the safety of such treatment plants can be significantly improved, as well as the safety of the byproducts of such plants.

Another advantage of this invention is that use of the receptacle 10 enables a method by which hazardous pharmaceuticals and their metabolized byproducts can be separated from human wastes at an appropriate facility. By providing proper identification of the treatment that a patient has undergone, the pharmaceuticals and byproducts present in the human waste can be identified, and potentially isolated and removed from the waste. The pharmaceuticals and their byproducts can then be properly disposed of or destroyed, as may be required by applicable regulations, while the remaining waste can be treated using conventional sewage processing techniques.

Finally, another advantage of this invention is that some pharmaceuticals can be reclaimed by known and appropriate techniques, and thereafter returned to a pharmaceutical company for purification and reuse. As such, the method of this invention provides a potentially economical source for certain pharmaceuticals. One foreseeable application is the reclamation of toxic pharmaceuticals used in the treatment of patients undergoing chemotherapy.

Accordingly, the present invention provides a method for collecting, separating and either safely disposing of or recycling toxic pharmaceutical waste material. The specialized portable waste receptacle 10 of this invention is equipped with a small reservoir with or without a sealed plastic liner into which a patient undergoing a toxic treatment can void for purposes of collecting all human wastes that contain the pharmaceutical and its metabolized byproducts. The receptacle 10 or the sealed liner can then be delivered to an appropriate facility where the contents of the receptacle 10 or the sealed liner are safely destroyed, or preferably, the toxic substances are isolated and removed for appropriate destruction or recycling.

While the invention has been described in terms of a preferred embodiment, it is apparent that other forms could be adopted by one skilled in the art. For example, the appearance and construction of the receptacle 10 could be modified from that shown in the figure. Accordingly, the scope of the invention is to be limited only by the following claims.

What is claimed is:

1. A method for isolating pharmaceutical agents from human wastes, said method comprising the steps of:
   providing a portable waste containment unit which is configured to serve as a toilet for an individual who has been treated with a pharmaceutical agent, said portable waste containment unit being further configured as a self-contained unit which is capable of being sealed for transport of human wastes to a facility;
   accumulating human wastes in said portable waste containment unit, said human wastes containing said pharmaceutical agent and metabolized byproducts thereof;
   transporting said portable waste containment unit and said human wastes contained therein to said facility; and
   removing said pharmaceutical agent from said human wastes.

2. The method of claim 1 wherein said providing step includes forming said portable waste containment unit to have a reservoir and an outer surface, said outer surface having a seat formed therein and a cover attached thereto for sealing said portable waste containment unit.

3. The method of claim 1 wherein said providing step includes forming said portable waste containment unit to have a handle attached thereto.

4. The method of claim 1 wherein said accumulating step comprises said individual sitting on said portable waste containment unit and voiding into said portable waste containment unit.

5. The method of claim 1 further comprising the step of disposing of said human wastes after said removing step.

6. The method of claim 1 further comprising the step of recycling said pharmaceutical agent after said removing step.

7. The method of claim 1 further comprising the step of disposing of said pharmaceutical agent after said removing step.

8. The method of claim 1 wherein said pharmaceutical agent is toxic or carcinogenic.

9. The method of claim 1 wherein said metabolized byproducts are toxic or carcinogenic.

10. The method of claim 1 wherein said removing step includes removing said metabolized byproducts from said human wastes.

11. A method for isolating pharmaceutical agents from human wastes, said method comprising the steps of:

providing a portable waste containment unit which is configured to serve as a toilet for an individual who has been treated with a pharmaceutical agent, said portable waste containment unit being further configured as a self-contained unit which is capable of being sealed for transport of human wastes to a facility, said portable waste containment unit having a waste reservoir or a reservoir liner and an outer surface, said outer surface having a seat formed therein and a cover attached thereto for sealing said portable waste containment unit;

accumulating human wastes in said portable waste containment unit by said individual sitting on said portable waste containment unit and voiding into said portable waste containment unit, said human wastes containing said pharmaceutical agent and metabolized byproducts thereof;

transporting said portable waste containment unit waste reservoir or sealed liner and said human wastes contained therein to said facility; and removing said pharmaceutical agent and said metabolized byproducts from said human wastes.

12. The method of claim 11 wherein said providing step includes forming said portable waste containment unit to have a handle attached thereto.

13. The method of claim 11 further comprising the step of disposing of said human wastes after said removing step.

14. The method of claim 11 further comprising the step of recycling said pharmaceutical agent after said removing step.

15. The method of claim 11 further comprising the step of disposing of said pharmaceutical agent after said removing step.

16. The method of claim 11 wherein said pharmaceutical agent is toxic or carcinogenic.

17. The method of claim 11 wherein said metabolized byproducts are toxic or carcinogenic.

18. The method of claim 11 further comprising the step of encoding said sealed liner or said portable waste containment unit and its removable waste reservoir so as to identify said pharmaceutical agent with which said individual has been treated.

* * * * *

UNITED STATES PATENT AND TRADEMARK OFFICE
CERTIFICATE OF CORRECTION

PATENT NO.     : 6,317,900 B1                                           Page 1 of 1
DATED          : November 20, 2001
INVENTOR(S)    : Earl J. Braxton It is certified that error appears in the above-identified patent and that said Letters Patent is hereby corrected as shown below:

<u>Title page,</u>
Item [74], *Attorney, Agent, or Firm,* delete "Vanophem & Vanophem", and insert
-- VanOphem & VanOphem --.
Item [57], ABSTRACT,
Line 1, delete "method for removing pharmaceutical agents from human wastes. Such pharmaceuticals may include their metabolized byproducts, either or both of which may be harmful as a toxin or a carcinogen. The method generally includes the use of a".
Line 5, delete "unit which", and insert -- receptacle that --.
Line 21, delete "patients'", and insert -- patient's --.

<u>Column 5,</u>
Line 27, after "FIG. 1", insert -- is a perspective --.

<u>Column 6,</u>
Line 39, after "Furthermore", insert a comma -- , --.
Line 65, delete "recetacle", insert -- receptacle --.

<u>Column 8,</u>
Line 19, delete "figure", and insert -- figures --.

Signed and Sealed this

First Day of April, 2003

JAMES E. ROGAN
*Director of the United States Patent and Trademark Office*